(12) United States Patent
Green et al.

(10) Patent No.: US 6,536,950 B1
(45) Date of Patent: Mar. 25, 2003

(54) SAPPHIRE REINFORCED THERMOCOUPLE PROTECTION TUBE

(75) Inventors: Steven R. Green, El Dorado, KS (US); Kent Santos, Buena Park, CA (US)

(73) Assignee: Texaco Inc., San Ramon, CA (US)

( * ) Notice: Subject to any disclaimer, the term of this patent is extended or adjusted under 35 U.S.C. 154(b) by 57 days.

(21) Appl. No.: 09/679,842

(22) Filed: Oct. 5, 2000

Related U.S. Application Data (60) Provisional application No. 60/159,346, filed on Oct. 13, 1999.

(51) Int. Cl.[7] ................................................. G01K 7/02
(52) U.S. Cl. ......................................... 374/179; 374/141
(58) Field of Search ................................... 374/179, 141

(56) References Cited

U.S. PATENT DOCUMENTS

| | | | |
|---|---|---|---|
| 2,963,353 A | 12/1960 | Eastman | 48/196 |
| 3,263,502 A | 8/1966 | Springfield | 374/179 |
| 5,000,580 A | 3/1991 | Leininger et al. | 374/130 |
| 5,005,986 A * | 4/1991 | Najjar et al. | 136/230 |
| 5,071,258 A * | 12/1991 | Usher et al. | 136/232 |
| 5,172,979 A | 12/1992 | Barkley et al. | 374/147 |
| 5,181,779 A * | 1/1993 | Shia et al. | 136/232 |
| 5,181,799 A | 1/1993 | Shia et al. | 374/179 |
| 5,242,226 A | 9/1993 | Ross et al. | 374/208 |
| 5,463,222 A | 10/1995 | Lesko et al. | 250/330 |
| 5,474,618 A | 12/1995 | Allaire | 136/234 |
| 5,712,165 A | 1/1998 | Alvarez et al. | 436/21 |
| 5,718,512 A | 2/1998 | Ngo-Beelmann | 374/148 |
| 5,736,092 A | 4/1998 | Apté et al. | 264/432 |
| 6,059,453 A * | 5/2000 | Kempf et al. | 374/139 |
| 6,280,083 B2 * | 8/2001 | Kita et al. | 136/234 |

FOREIGN PATENT DOCUMENTS

| | | | |
|---|---|---|---|
| DE | 91 09 308.2 | 11/1992 | |
| DE | 41 38 460 A1 | 5/1993 | |
| GB | 1 119 338 A | 7/1968 | |
| WO | WO 93/10427 | 5/1993 | |
| WO | WO 00/00797 | 1/2000 | G01K/1/10 |

OTHER PUBLICATIONS

Cushing, Frank S., *New Development in F–O Sensor Probe Design*, Sensors, pp. 49–54 (1994)

*Solutions in Sapphire* Newsletter Issue #1, Feb. 16, 1997.

* cited by examiner

*Primary Examiner*—Diego Gutierrez
*Assistant Examiner*—Lydia M. De Jesús
(74) *Attorney, Agent, or Firm*—Frank C. Turner; Morris N. Reinisch; Howrey Simon Arnold & White, LLP (57) ABSTRACT

An improved apparatus including a thermocouple for measuring the temperature in a gasification process is provided. The improvement includes a sapphire reinforced outer protection tube for enclosing at least a portion of the thermocouple. The sapphire reinforced outer protection tube may be integrally formed around an inner protection tube, the inner protection tube being receptive of a sapphire-sheathed thermocouple. The apparatus may be inserted directly into a gasification stream without the use of a thermowell. The sapphire reinforced outer protection tube increases the life of the thermocouples used in gasification processes.

30 Claims, 4 Drawing Sheets

SAPPHIRE REINFORCED THERMOCOUPLE PROTECTION TUBE

Priority of U.S. Provisional Patent Application entitled: "Sapphire Reinforced Thermocouple Protection Tube", Provisional Application No: 60/159,346, filed Oct. 13, 1999 is claimed.

FIELD OF THE INVENTION

This invention relates generally to a thermocouple used in a gasification process and, more particularly, to the use of a new sapphire reinforced outer protection tube to extend the useful life of thermocouples used in a gasification process.

BACKGROUND OF THE INVENTION

In high temperature gasification processes, a hot partial oxidation gas is produced from hydrocarbonaceous fuels, for example coal. In these processes, the hydrocarbonaceous fuels are reacted with a reactive oxygen-containing gas, such as air or oxygen, in a gasification reactor to obtain the hot partial oxidation gas.

In a typical gasification process, the hot partial oxidation gas will substantially comprise $H_2$, CO, and at least one gas from the group $H_2O$, $CO_2$, $H_2S$, COS, $NH_3$, $N_2$, Ar, along with particulate carbon, ash, and/or molten slag typically containing species such as $SiO_2$, $Al_2O_3$, and the oxides and oxysulfides of metals such as Fe and Ca.

The hot partial oxidation gas in the gasification reactor will commonly be at a temperature ranging from 1,700° to 3,000° F., and more typically in the range of about 2,000° to 2,800° F., and at a pressure commonly in the range of about 1 to about 250 atmospheres, and more typically in the range of about 15 to 150 atmospheres.

Thermocouples are commonly used for measuring temperature in these high temperature processes. The thermocouples can be used to measure the temperature in the gasification reactor. They may also be used to measure the temperature in downstream process steps in which the effluent is cooled and particulate and gaseous contaminants are removed.

Thermocouples are pairs of wires of dissimilar metals which are connected at both ends. The content of the wires must be sufficiently dissimilar to allow for a difference in electrical potential between them. Except for the ends, the two wires are electrically insulated from each other. The electrical insulation is commonly provided by a tube of insulating material having two non-intersecting holes passing lengthwise through the tube. Typical insulating materials include high temperature, high purity ceramics, such as alumina.

When the two junctions of the wires are at different temperatures, a difference in electrical potential exists between them. The difference in electrical potential and therefore the difference in temperature can be measured by a voltage measuring instrument placed in the thermocouple circuit or alternatively by a voltage measuring instrument that is sent signals by a transmitter placed in the thermocouple circuit.

The choice of dissimilar metals used for the thermocouple will vary depending on, among other things, the expected temperature range to be measured. For instance, one type of thermocouple commonly employed under the conditions present in a gasification reactor has one wire that contains platinum and about 30% rhodium and a second wire that contains platinum and about 6% rhodium. Other pairs of metals are used for different temperature ranges.

One problem apparent with the use of thermocouples in the environment present in a gasification process, particularly the environment present in the gasification reactor, is the relatively short lifespan of the thermocouples. The relatively short lifespan is due in part to the extremely high temperatures and corrosive atmosphere that prevails during the operation of the gasification reactor. An unprotected thermocouple left in this environment is quickly attacked and rendered useless. Such attack can be most severe when the thermocouple comes into contact with molten slag present in the reactor.

To alleviate this problem, thermocouples are commonly inserted into a refractory thermowell disposed along the outer wall of a gasification reactor or other exterior process surface. The refractory thermowells would include barriers of chrome-magnesia, high chrome, or similar slag resistant materials, and may incorporate other refractory and non-refractory materials such as $Al_2O_3$, MgO, and stainless steel.

When used in a gasification reactor, the thermowell may be introduced by passing it through an opening in the outer wall of the reactor pressure vessel. The thermowell may then pass through a corresponding opening in a refractory material, or series of refractory materials, commonly used to line the inner surface of the reactor pressure vessel. The thermowell may extend into the open space of the reactor or it may be set back at a slight distance from the interior of the reactor.

Unfortunately, positioning the thermocouple inside a thermowell has not provided a complete solution. Over time, molten slag will breach the thermowell. The breach is commonly due to the effects of erosion and corrosion as well as thermal and/or mechanical shocks and stresses. However, the breach may also be due, totally or in part, to an inherent fault in the thermowell. The breach, typically small initially, allows molten slag to enter the thermowell where it can come in contact with the thermocouple, rendering it useless.

It would therefore be beneficial to have a means to increase the lifespan of thermocouples used in a gasification process.

In some gasification processes, such as described in pending U.S. patent application Ser. No. 09/106,133, herein incorporated by reference, use of a sapphire envelope enclosing at least a portion of the thermocouple has been described to increase the life of the thermocouple. In the application pending as Ser. No. 09/106,133, the sapphire envelope is in the form of a sapphire sheath fitted over the tip of thermocouple. That apparatus may also comprise a thermowell, with the sapphire envelope being provided inside the thermowell.

In some embodiments of the present invention, it is contemplated that sapphire or other corundum may be added to an outer protection tube to extend the operating periods of thermocouples used in gasification processes without the need for a thermowell.

SUMMARY OF THE INVENTION

In one embodiment of the present invention there is disclosed an apparatus including a thermocouple for measuring the temperature in a gasification process, the improvement comprising a sapphire reinforced outer protection tube arranged about the thermocouple and enclosing at least a portion of the thermocouple. Th embodiment may further include an inner protection tube inside the outer protection tube, the inner protection tube being receptive of the thermocouple. The inner protection tube may include alumina or sapphire. The sapphire used for the outer protection tube may be structural-grade non optical fiber, and the fiber reinforces a composite, the composite and sapphire reinforcement defining the outer protection tube.

In some embodiments the outer protection tube may be attached to a support tube. In such embodiments the outer protection tube may be tapered to fit snugly inside a distal end of the support tube. The outer protection tube and support tube may fully enclose the thermocouple.

In some embodiments the outer protection tube is inserted directly into a gasification stream without a thermowell.

The outer protection tube may be molded around an inner protection tube, and the inner protection tube is receptive of a thermocouple. The inner protection tube may include alumina or pure (synthetic) sapphire.

Some embodiments include a sapphire sheath removably arranged about a distal end of the thermocouple, the sapphire including synthetic sapphire. The sapphire sheath may include an open end portion and a plug portion, with both the open end portion and the plug portions including synthetic sapphire. In this embodiment, distal ends of a pair of thermocouple wires may be bent to a radially outward biased configuration to facilitate a snug fit between the sapphire sheath and the thermocouple. This embodiment may further include an inner protection tube inside the outer protection tube, the inner protection tube being receptive of the thermocouple and sapphire sheath. The inner protection tube may include alumina or synthetic sapphire. In a variation of this embodiment, platinum foil is wrapped around the thermocouple to provide a snug fit between the sapphire sheath and the thermocouple.

There is also disclosed a thermocouple system for use in a gasification system including a thermocouple, the thermocouple including a pair of wires of dissimilar metal joined together at one end by a hot junction and at the other end by a cold junction but otherwise electrically insulated by an insulating tube; a thermocouple inner protection tube receptive of the pair of wires and the insulating tube; and a thermocouple outer protection tube, wherein the outer protection tube includes sapphire. In this embodiment the outer protection tube may further include a sapphire-reinforced ceramic integrally molded around the inner protection tube. The inner protection tube may include sapphire. A support tube may be connected to the outer protection tube, the support tube extending into a gasification reactor. The temperatures to be measured range from about 1,300° F. to about 3,000° F.

There is also disclosed a method of measuring temperatures in a gasification process including the steps of: providing a thermocouple comprising a pair of wires of dissimilar metal joined together at one end by a hot junction and at the other end by a cold junction but otherwise electrically insulated from each other by an insulating tube; providing an outer protection tube comprising sapphire connected to a support tube; inserting the outer protection tube and support tube into a gasification reactor; and inserting the thermocouple into the outer protection tube.

There is also disclosed a method of constructing a sapphire-reinforced outer protection tube including the steps of: providing a mold; providing an inner protection tube; inserting the inner protection tube into the mold; adding sapphire fiber to a composite to create a sapphire-reinforced composite; pouring the sapphire-reinforced composite into the mold where at least a portion of the inner protection tube is surrounded by the sapphire-reinforced composite; and curing the composite.

BRIEF DESCRIPTION OF THE DRAWINGS

The foregoing and other features and aspects of the invention will become further apparent upon reading the following detailed description and upon reference to the drawings in which.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Gaseous mixtures substantially comprising $H_2$, CO, and at least one gas from the group $H_2O$, $CO_2$, $H_2S$, COS, $NH_3$, $N_2$, Ar, along with particulate carbon, ash and/or molten slag typically containing species such as $SiO_2$, $Al_2O_3$, and the oxides and oxysulfides of metals such as Fe and Ca are commonly produced by well known partial oxidation processes in the reaction zone of a free-flow, down-flowing vertical refractory lined steel pressure vessel. An example of such a process and pressure vessel are shown and described in co-assigned U.S. Pat. No. 2,818,326 hereby incorporated by reference. In such a process, the partial oxidation gas will typically be subjected to cooling and additional purification steps in which particulate contaminants, gaseous contaminants, and water vapor are removed.

The partial oxidation gas produced from such a process will, depending on chemical composition and intended end use, commonly be referred to as synthesis gas, fuel gas, or reducing gas. The generic partial oxidation gas will be referred to herein as encompassing all of these potentialities.

The feed used to produce the partial oxidation gas comprises hydrocarbonaceous fuels. The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". For example, there are (1) pumpable slurries of solid carbonaceous fuels, such as particulate carbon dispersed in a vaporizable liquid carrier, such as water, liquid hydrocarbon fuel, and mixtures thereof, and (2) gas-liquid-solid dispersions, such as atomized liquid hydrocarbon fuel and particulate carbon dispersed in a temperature moderating gas.

The term "liquid hydrocarbon," as used herein to describe suitable liquid feedstocks, is intended to include various materials, such as liquefied petroleum gas, petroleum distillates and residua, gasoline, naphtha, kerosene, crude petroleum, asphalt, gas oil, residual oil, tar-sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

"Gaseous hydrocarbons," as used herein to describe suitable gaseous feedstocks, include methane, ethane, propane, butane, pentane, natural gas, coke-oven gas, refinery gas, acetylene tail gas, ethylene off-gas, and mixtures thereof.

"Solid hydrocarbon fuels," as used herein to describe suitable solid feedstocks, include, coal in the form of anthracite, bituminous, subbituminous; lignite; coke; residue derived from coal liquefaction; peat; oil shale; tar sands; petroleum coke; pitch; particulate carbon (soot or ash); solid carbon-containing waste materials, such as sewage; and mixtures thereof.

Solid, gaseous, and liquid feeds may be mixed and used simultaneously; and these may include paraffinic, olefinic, acetylenic, naphthenic, and aromatic compounds in any proportion. Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

In the reaction zone of a gasification reactor, the hydrocarbonaceous fuel is contacted with a free-oxygen containing gas, optionally in the presence of a temperature moderator. The reaction time will typically be in the range of about 1 to 10 seconds, and preferably about 2 to 6 seconds. In the reaction zone, the contents will commonly reach temperatures in the range of about 1,700° to 3,000° F., and more typically in the range of about 2,000° to 2,800° F. Pressure will typically be in the range of about 1 to about 250 atmospheres, and more typically in the range of about 15 to about 150 atmospheres. As the partial oxidation gas proceeds downstream, the temperature of the flow will be reduced as the gas is subjected to various cooling, washing, and other steps.

In accordance with the present invention, temperature may be measured at various locations within the gasification process by thermocouples having employed therewith a sapphire or other corundum-reinforced outer protection tube. The use of a sapphire reinforced outer protection tube in accordance with the various embodiments of the invention, amongst other advantages, increases the useful life of the thermocouple over conventional thermocouples. In its various embodiments, the sapphire reinforced outer protection tube will enclose at least a portion of a thermocouple with which it is employed. The use of the sapphire reinforced outer protection tube is particularly advantageous when it is used in conjunction with thermocouples positioned so as to measure the temperature in the gasification reactor, as the detrimental effects of high temperatures, molten slag, and corrosives are most prevalent in the reactor. Another particular advantage of the sapphire reinforced outer protection tube is its ability to prolong thermocouple life without the use of a thermowell.

Temperature devices such as thermocouples need to be advantageously constructed of materials strong enough to withstand the high gasifier temperatures and the aggressive chemical environment. Specifically, the thermocouple and its protective covering must be able to (1) resist chemical attack by fluids inside the gasifier, (2) resist the erosive action of particles carried along by the product gas, (3) withstand the thermal shock associated with startup and shutdown events, (4) resist mechanical forces generated by layers of gasifier refractory as they expand and contract during heating and cooling, and (5) withstand both oxidizing and reducing conditions. In solid feed systems, thermocouple life times are also reduced by the presence of slag.

Figure 1A:
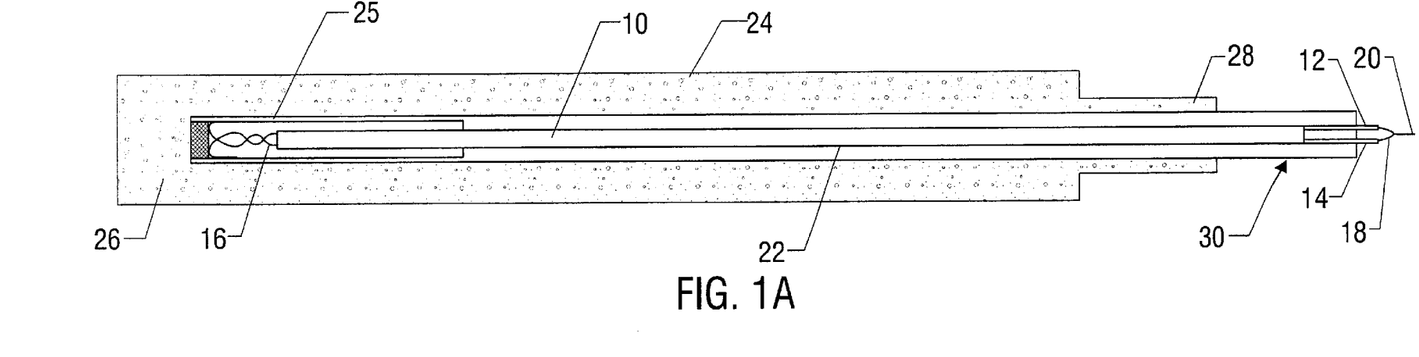
FIG. 1A depicts a cut-away view of a thermocouple and outer protection tube in accordance with one aspect of the invention.

In one embodiment of the present invention shown in FIG. 1A, sapphire fiber is added to a composite used to make an outer protective tube 24 of the thermocouple. The sapphire structural fiber may be of non-optical grade such as that used high strength, high temperature composites. The sapphire fiber may overlap on itself within the composite mixture to form a stronger outer protective tube. The sapphire reinforced outer protection tube 24 resists shearing, breaking, and cracking during thermoshock. Sapphire is the non-red variety of corundum and is rated very high on the hardness scale (9 mohs, the second hardest natural mineral known to mankind). The addition of sapphire fiber to the outer protection tube composite increases the life of outer protection tube 24 and thus the operating periods of the thermocouples.

Figure 1B:
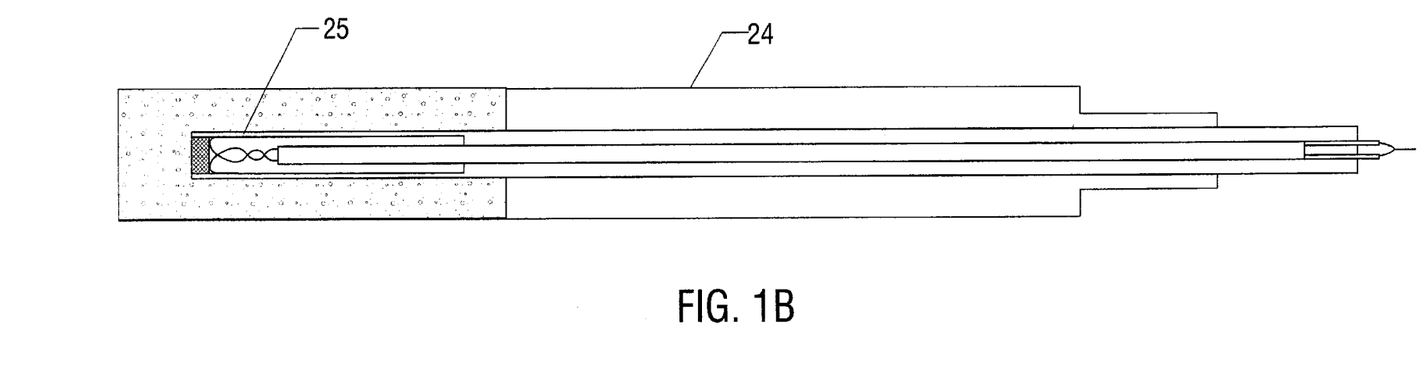
FIG. 1B depicts a cut-away view of a thermocouple and outer protection tube in accordance with another aspect of the invention.

In one embodiment of the present invention, the sapphire reinforced outer protection tube 24 includes sapphire fibers in the composite along the entire length of the protection tube as shown in FIG. 1A. Alternatively, depending on the quantity of fiber, the outer protection tube may include sapphire reinforcing fibers only along a portion of the composite protection tube length as shown in FIG. 1B. In FIG. 1B, the reinforcing sapphire fibers are only introduced along the distal twelve to fifteen inches of outer protection tube 24. The sapphire used to reinforce the composite comprising outer protection tube 24 may be non-optical grade structural fiber.

In the embodiment of the present invention shown in FIG. 1A, the sapphire reinforced outer protection tube 24 encloses at least a portion of a thermocouple inner protective tube 30. In this preferred embodiment inner protective tube 30 may comprise a high temperature, high purity ceramic tube. Such a ceramic tube can be made of, for example, alumina. In an alternative embodiment, inner protective tube 30 may comprise sapphire. A thermocouple 10 may be arranged inside inner protective tube 30 as shown in the Figures. The thermocouple 10 is comprised of a pair of wires 12 and 14. The wires have dissimilar metal content such that a difference in electrical potential can develop between them when the thermocouple is exposed to a heat source. In an exemplary embodiment wires 12 and 14 may both contain platinum and rhodium as their primary substituents with the amounts of platinum and rhodium being different in the two wires. Preferably one of the wires includes about 30% rhodium while the other wire may have about 6% rhodium. For both wires, the remainder is primarily platinum.

The wires are joined to each other at a hot junction 16 and cold junction 18. The terms "hot" and "cold" are used because when employed to measure the temperature of a gasification reactor the hot junction 16 is positioned closer to the heat source. The difference between the electrical potential of the two wires, being representative of the temperature at the hot end, is measured. It is not critical how the difference in potential is measured. In fact, various means are known to those of ordinary skill in the art for measuring the difference in electrical potential. Any of these methods can be used in the present invention. For example, a voltage meter can be placed in the thermocouple circuit. Alternatively, and preferably, the cold junction 18 is provided at a temperature transmitter. The signal generated by the temperature transmitter can then be relayed to a control room or other location by signal transfer means 20.

Except for the hot and cold junctions, the two wires 12 and 14 are otherwise electrically insulated from each other. While it is not critical how insulated, in the embodiment disclosed, electrical insulation 22 is provided by a high temperature, high purity ceramic tube. Such a ceramic tube can be made of, for example, alumina.

If thermocouple 10 as described in the preceding paragraphs is utilized alone or in combination with a typical thermowell to measure the temperature of a gasification reactor (i.e. there is no outer protection tube 24), the thermocouple will quickly succumb to the slag and other detrimental materials present in the reactor. It is for at least this reason that in the present embodiment sapphire reinforced outer protection tube 24 is provided to be arranged around at least a portion of inner protective tube 30, preferably covering the entire inner tube portion exposed to the slag. The sapphire reinforced outer protection tube 24 is substantially resistant to attack from the slag and other products of the gasification process. The sapphire reinforcement significantly strengthens outer protection tube and becomes advantageously resistant to thermal shock and erosion. Common to gasification processes are start-ups, shut-downs, and other events that may introduce drastic temperature swings. Thermal shocks associated with such events often cause stresses in thermocouples far in excess of the material properties' capability to endure, and fractures and failures result. The introduction of sapphire into outer protection tube 24 adds significant strength and erosion resistance to the protection tube, thus increasing the useful life of the thermocouples housed therein.

In one embodiment, the completed thermocouple and sapphire reinforced outer protection tube 24, can be viewed as having a distal or first end 26 adjacent to the hot junction 16.

Figure 2:
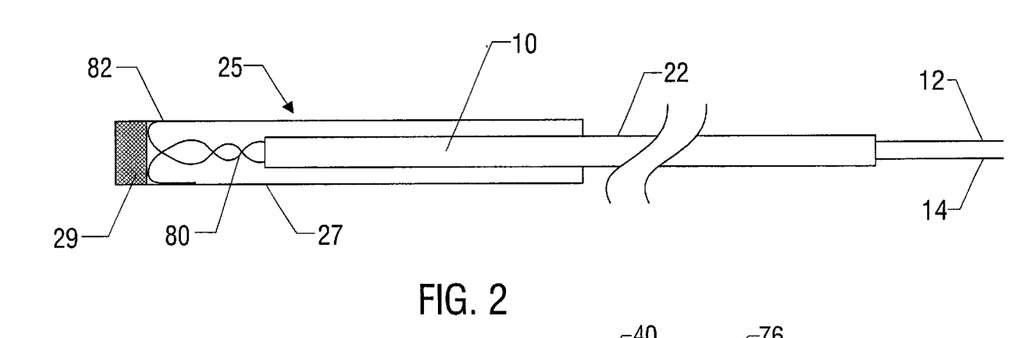
FIG. 2 depicts a cut-away view of the thermocouple of either of FIGS. 1A or 1B.

In a preferred embodiment, thermocouple 10 also includes a protective sheath, for example sapphire sheath 25 shown in FIGS. 1A, 1B, 2, and 3. Sapphire sheath 25 may comprise synthetic sapphire (pure corundum). Sapphire sheath 25 may include an open end portion 27 and an integral plug portion 29. Each of open end portion 27 and plug portion 29 may comprise synthetic sapphire. In a preferred embodiment, sapphire sheath 25 extends approximately ten inches in length, but other lengths suitable to the particular application are also contemplated. Sapphire sheath 25 further protects thermocouple 10 from the harsh conditions within the gasification reactor. In an alternative embodiment such as shown in FIG. 4, the use of sapphire sheath 25 is omitted. Positioning of the thermocouple 10 within sapphire sheath 25 may be facilitated by a "pigtail" 82 formed by the distal ends of thermocouple wires 12 and 14 as shown in FIG. 2. Pigtail 82 creates a snug fit between thermocouple 10 and sapphire sheath 25. To form pigtail 82, thermocouple wires 12 and 14 may be twisted together at a joint 80, with the excess wire being arranged in a configuration such that inserting the thermocouple into sapphire sheath 25 causes pigtail 82 to meet an inner wall of sapphire sheath 25. The resistance between pigtail 82, which is radially outward biased, and the inner wall of sapphire sheath 25 creates the snug fit and hinders relative motion between the thermocouple and the sapphire sheath. In alternative embodiments, platinum foil or other material may be wrapped around electrical insulation tube 22 and/or wrapped around the inner surface of sapphire sheath 25 to provide a good fit between thermocouple 10 and sapphire sheath In some embodiments, the sapphire reinforced outer protection tube 24 may extend over and cover a larger portion, if not substantially all of the existing thermocouple.

In a preferred embodiment, outer protection tube 24 is formed around inner protection tube 30 using a molding process. Inner protection tube 30 may be placed in a mold (not shown) and centrally positioned using, for example, spacers. The sapphire reinforced ceramic may then be poured into the mold to integrally form outer protection tube 24 around at least a portion of inner protection tube 30. When the ceramic cures, outer protection tube 24 is a strong, sapphire reinforced member enclosing at least a portion of inner protection tube 30. In the alternative, outer protection tube 24 is separately formed and inner protection tube 30 is subsequently inserted into outer protection tube 24.

Outer ceramic tube 24 may be somewhat porous and susceptible in some applications to slag and gas migration. In the event that slag and/or gas migrate through outer protection tube 24, pure sapphire sheath 25 prevents further migration to inner protective tube 30 and thermocouple wires 12 and 14. In one preferred embodiment sapphire sheath 25 only extends approximately ten inches in length. It will be appreciated by one of skill in the art with the benefit of this disclosure that as the slag and/or gas migrate closer to the walls of the reactor, the temperature decreases. As a result of this cooling, there is typically little or no slag and/or gas migration through outer protection tube 24 at distances of ten inches or greater from distal end 26. Typically the slag solidifies at no more than five inches from the distal end 26. However, inasmuch as an application may be found in which slag and/or gas migration occurs at distances of greater than ten inches from distal end 26 of outer protection tube 24, sapphire sheath 25 may be extended in length as necessary.

Figure 3:
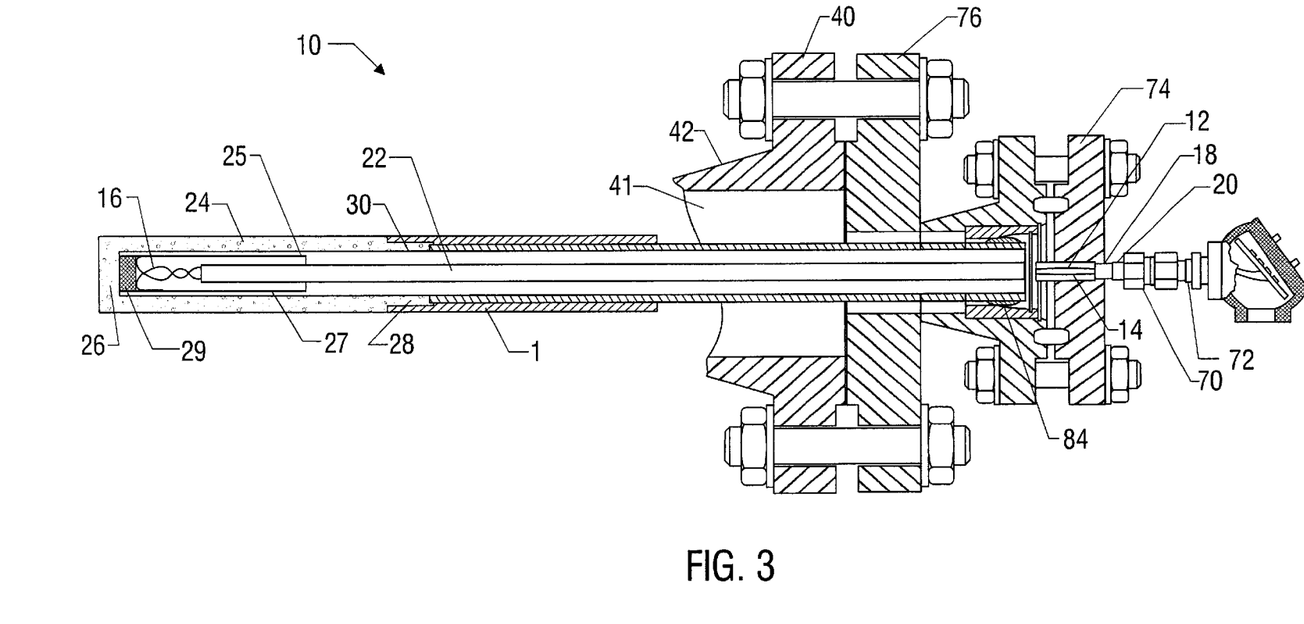
FIG. 3 depicts a cross-sectional view of a portion of a gasification reactor wall and a thermocouple in accordance with one aspect of the invention.
Figure 4:
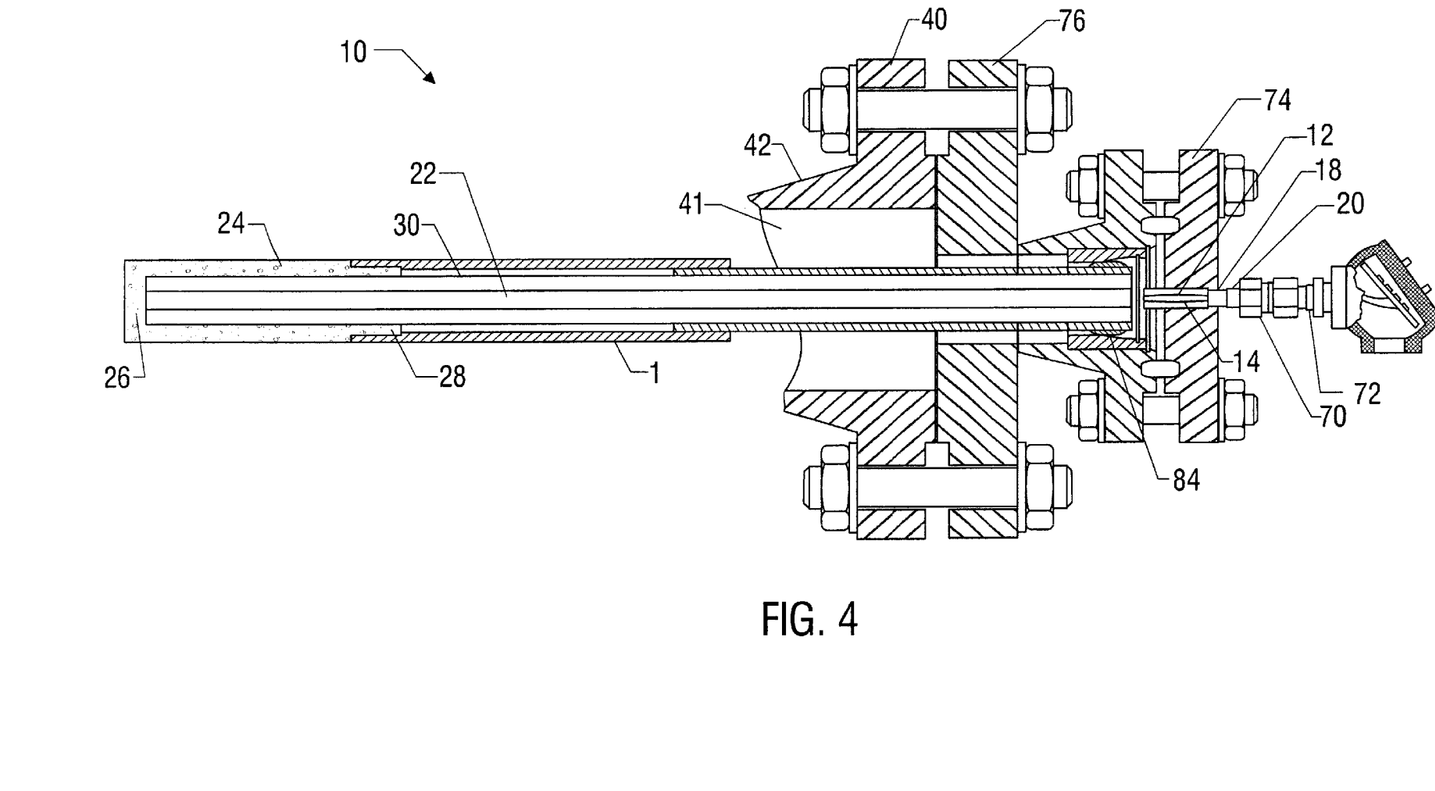
FIG. 4 depicts a cross-sectional view of a portion of a gasification reactor wall and a thermocouple in accordance with another aspect of the invention.

Referring next to FIGS. 3–4, outer protection tube 24 may be matingly engagable with a support tube 1 at a first end 28 of outer protection tube 24. In the preferred embodiment shown in FIG. 3, outer protection tube 24 is tapered at second end 28 to fit snugly inside a distal end of support tube 1. High temperature cement may be used to seal the annulus between support tube 1 and second end 28 of outer protection tube 24. In the alternative, outer protection tube 24 may attach to support tube 1 by any other convenient means including, but not limited to, a mating connection between a support tube that tapers at the distal end and an outer protection tube that flares at an open end to matingly fit over the support tube. Support tube 1 may comprise stainless steel or other corrosive resistant materials and extends from a removable flange 74 through an outer steel wall 40 of the pressure vessel gasification reactor. In the embodiments shown in FIGS. 3–4, support tube 1 is a telescoping tube that exhibits a larger diameter at the distal end than at the proximal end to fit over the tapered second end 28 of outer protection tube 24. Alternatively, support tube 1 may not be telescopic.

It is contemplated that the sapphire reinforced outer protection tube 24 enclose at least the hot junction 16. This enables an operator to insert the outer protection tube—and thus the thermocouple hot junction—into the gasification stream for most accurate temperature measurement.

In one embodiment, the sapphire reinforced outer protection tube 24 is molded around at least a portion of inner protective tube 30. Thermocouple 10, including sapphire sheath 25, may slide freely into inner protective tube 30 until plug portion 29 abuts the distal end of the inner protective tube as shown in FIG. 1. Contact between plug portion 29 and inner protective tube 30 facilitates accurate reactor temperature measurement.

In some embodiments the thickness of the sapphire reinforced outer protection tube is approximately one inch. Other embodiments may comprise any variations in the thickness or the length of sapphire reinforcement for outer protection tube 24.

In the embodiment illustrated in FIGS. 3–4, thermocouple 10 is inserted into the gasification reactor 40, distal end 26 first. The thermocouple 10 is passed through a flanged reducer 76 and into the combination of outer tube 24 and support tube 1. Support tube 1 is supported by a ball swivel and support 84, which is in contact with and mated to the flanged reducer 76. The distal end 16 of the thermocouple 10 is positioned adjacent to the distal end 26 of outer protection tube 24. A gap of about 0.125 to about 0.25 inches is preferably maintained between the inside surface outer protection tube 24 and the distal end 16 of the thermocouple. Distal end 16 of thermocouple 10 may preferably include, as discussed previously, sapphire sheath 25. Thermocouple 10, when enclosed in outer protection tube 24, may be inserted directly into a gasification stream without the need for a thermowell.

The proximal ends of wires 12 and 14 of thermocouple 10 extend past the proximal end of the electrical insulation 22, and/or the sapphire reinforced outer protection tube 24 and support tube 1 (if the support tube is coterminous with the electrical insulation 22 as shown in FIG. 3). The wires continue through a pressure sealing fitting 70. The pressure sealing fitting 70 is disposed adjacent to a bushing 72 which fits into a removable flange 74. Removable flange 74 mates with a flange reducer 76 that is mated to outer steel wall 40 of the pressure vessel gasification reactor.

The use of two separate connections (74 and 76) provides for increased efficiency such that a thermocouple 10 can be replaced without removing the combination of outer tube 24 and support tube 1. In the alternative, threaded caps and nozzles or other connection means may be used in place of mating flanges 74 and 76.

Thermocouple 10 with outer protection tube assembly 24 exhibits increased resistance to slag in a gasification reaction. In the embodiments disclosed, the slag passes directly around outer protection tube 24, there is no thermowell to insulate outer protection tube from the moving slag. A breach may ultimately form in the sapphire reinforced outer protection tube 24, but the life of the thermocouple is extended by reinforcing the outer protection tube with sapphire. If sapphire reinforced outer protection tube 24 finally fails, the sapphire sheath 25 and/or inner protective tube 30 may become exposed to the effects of erosion and corrosion. If inner protection tube 30 and sapphire sheath 25 fail, then wires 12 and 14 and the hot junction 16 are left unprotected, and the thermocouple 10 fails altogether. The selection of an appropriate length for the sapphire reinforced outer protection tube 24 is within the skill of one of ordinary skill in the art having knowledge of the characteristics of their specific process, including temperature and gas composition, and having the benefit of this disclosure.

Figure 5:
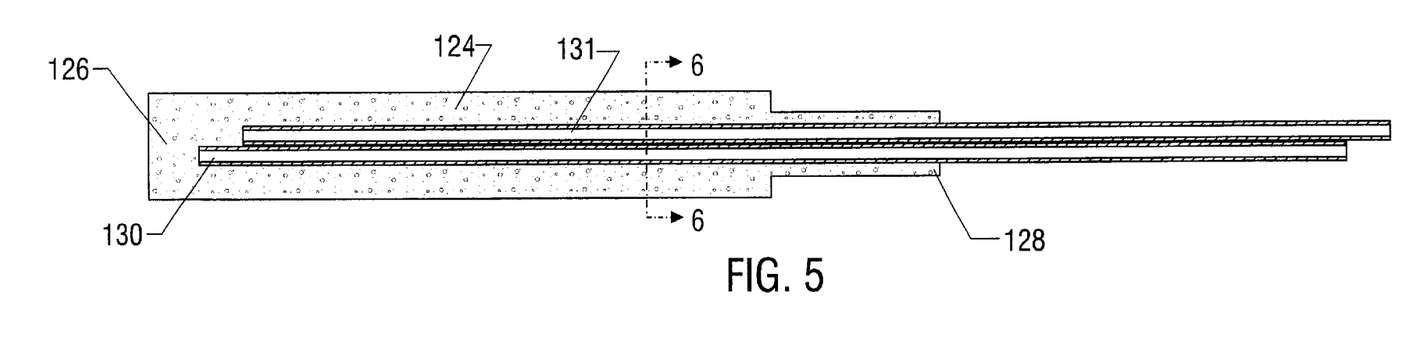
FIG. 5 depicts a longitudinal cross-sectional view of an outer protection tube in accordance with another aspect of the invention.
Figure 6:
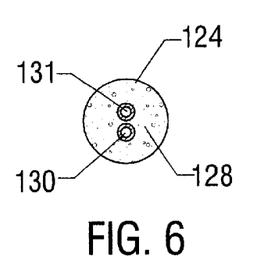
FIG. 6 depicts a top cross-sectional view of the protection tube of FIG. 5.

In other embodiments such as the embodiment shown in FIGS. 5–6, two or more inner protection tubes, for example inner protection tubes 130 & 131, are placed in a mold together before forming sapphire-reinforced outer protection tube 124 around the inner protections tubes. In a preferred embodiment, each of the distal ends of the two or more inner protection tubes is staggered at a different length along the outer protection tube 124. Two or more inner protection tubes facilitate the introduction of two ore more thermocouples. This staggered arrangement of multiple inner protection tubes provides for increased service time between thermocouple replacement. For example, in the embodiment of FIG. 5 in which two inner protection tubes 130 and 131 are shown, a failure or slag and/or gas migration through outer protection tube 124 may result in the ultimate failure of a thermocouple (not shown) inserted into inner protection tube 130, but a thermocouple contained in inner protection tube 131 may not be breached until some time later. Because outer protection tube 124 is poured around inner protection tubes 130 and 131, a breach through outer protection tube 124 will not have a direct path to inner protection tube 131. Ultimately outer protection tube 124 may be further breached and reach inner protection tube 131, but the time between the breach to inner protection tube 130 and 131 will normally be staggered as the temperatures in the reactor decrease as they near the walls of the reactor. It will be understood by one of skill in the art with the benefit of this disclosure that a breach in outer protection tube 124 if most likely to occur first at distal end 126, the hottest portion of the reaction chamber, and any further breaches will normally come later in time toward the proximal end 128 of the outer protection tube. With two or more inner protection tubes each housing a thermocouple at staggered lengths along outer protection tube 124, reactor operations may continue without interruption well after the destruction the most-distally-located thermocouple. It will be understood by one of skill in the art with the benefit of this disclosure that more than two inner protection tubes may be used, the embodiment shown in FIGS. 5–6 are merely exemplary of multiple thermocouple capability with sapphire reinforced outer protection tube 124. While the accuracy provided by a second (or even additional) thermocouple may not be as good as the first thermocouple as to the hottest portion of the reactor, the difference does not pose a problem for process controllers as the readings for the second (or additional) thermocouple may be calibrated and corrected based on data gathered prior to the failure of the first thermocouple.

While the present invention has been particularly shown and described with reference to a particular illustrative embodiment thereof, it will be understood by those skilled in the art that various changes in form and details may be made without departing from the spirit and scope of the invention. The above-described embodiment is intended to be merely illustrative, and should not be considered as limiting the scope of the present invention.

What is claimed is:

1. In an apparatus comprising a thermocouple for measuring the temperature in a gasification process, the improvement comprising a sapphire reinforced composite outer protection tube arranged about the thermocouple and enclosing at least a portion of the thermocouple, wherein the sapphire comprises structural-grade non optical fibers.

2. The apparatus of claim 1 further comprising an inner protection tube inside the outer protection tube, the inner protection tube being receptive of the thermocouple.

3. The apparatus of claim 2 wherein the inner protection tube comprises alumina.

4. The apparatus of claim 2 wherein the inner protection tube comprises sapphire.

5. The apparatus of claim 1 wherein the outer protection tube is attached to a support tube.

6. The apparatus of claim 5 wherein the outer protection tube is tapered to fit snugly inside a distal end of the support tube.

7. The apparatus of claim 5 wherein the outer protection tube and support tube fully enclose the thermocouple.

8. The apparatus of claim 1 wherein the outer protection tube is inserted directly into a gasification stream without a thermowell.

9. The apparatus of claim 1 wherein the outer protection tube is molded around an inner protection tube.

10. The apparatus of claim 9 wherein the inner protection tube is receptive of the thermocouple.

11. The apparatus of claim 9 wherein the inner protection tube comprises alumina.

12. The apparatus of claim 9 wherein the inner protection tube comprises sapphire.

13. In an apparatus comprising a thermocouple for measuring the temperature in a gasification process, the improvement comprising a sapphire reinforced outer protection tube arranged about the thermocouple and enclosing at least a portion of the thermocouple, and a sapphire sheath removably arranged about a distal end of the thermocouple.

14. The apparatus of claim 13 wherein the sapphire sheath comprises synthetic sapphire.

15. The apparatus of claim 13 wherein the sapphire sheath comprises an open end portion and a plug portion.

16. The apparatus of claim 15 wherein the open end portion and the plug portion comprise synthetic sapphire.

17. The apparatus of claim 13 wherein distal ends of a pair of thermocouple wires are bent to a radially outward biased configuration to facilitate a snug fit between the sapphire sheath and the thermocouple.

18. The apparatus of claim 13 further comprising an inner protection tube inside the outer protection tube, the inner protection tube being receptive of the thermocouple and sapphire sheath.

19. The apparatus of claim 18 wherein the inner protection tube comprises alumina.

20. The apparatus of claim 18 wherein the inner protection tube comprises synthetic sapphire.

21. The apparatus of claim 13, wherein platinum foil is wrapped around the thermocouple to provide a snug fit between the sapphire sheath and the thermocouple.

22. A thermocouple system for use in a gasification system comprising:

a thermocouple, the thermocouple comprising a pair of wires of dissimilar metal joined together at one end by a hot junction and at the other end by a cold junction but otherwise electrically insulated by an insulating tube;

a thermocouple inner protection tube receptive of the pair of wires and the insulating tube; and a thermocouple outer protection tube, wherein the outer protection tube comprises a composite reinforced with sapphire fibers.

23. The thermocouple system of claim 22 wherein the inner protection tube comprises sapphire.

24. The thermocouple system of claim 22 further comprising a sapphire sheath receptive of the distal end of the thermocouple.

25. The thermocouple system of claim 22 wherein the insulating tube comprises alumina.

26. The thermocouple system of claim 22 wherein the inner protection tube comprises alumina.

27. The thermocouple system of claim 22 further comprising a support tube connected to the outer protection tube, the support tube extending into a gasification reactor.

28. The thermocouple system of claim 22 wherein the temperatures to be measured range from about 1,300° F. to about 3,000° F.

29. The thermocouple system of claim 22 wherein the pair of wires are comprised of platinum, rhodium, or mixtures thereof.

30. A method of measuring temperatures in a gasification process using a thermocouple, the method comprising the steps of:

providing a thermocouple comprising a pair of wires of dissimilar metal joined together at one end by a hot junction and at the other end by a cold junction but otherwise electrically insulated from each other by an insulating tube;

providing an outer protection tube comprising composite reinforced with sapphire fibers, said outer protection tube connected to a support tube;

inserting the outer protection tube and support tube into a gasification reactor; and inserting the thermocouple into the outer protection tube.

* * * * *